United States Patent
Lin et al.

(10) Patent No.: US 7,844,449 B2
(45) Date of Patent: Nov. 30, 2010

(54) SCALABLE PROBABILISTIC LATENT SEMANTIC ANALYSIS

(75) Inventors: Chenxi Lin, Beijing (CN); Jie Han, Beijing (CN); Guirong Xue, Beijing (CN); Hua-Jun Zeng, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/392,763

(22) Filed: Mar. 30, 2006

(65) Prior Publication Data

US 2007/0239431 A1    Oct. 11, 2007

(51) Int. Cl.
*G06F 17/27* (2006.01)

(52) U.S. Cl. ............... 704/9; 704/1; 704/10; 707/706; 707/707; 707/708

(58) Field of Classification Search ............ 704/1, 704/9, 10; 707/2–6, 706–708
See application file for complete search history.

(56) References Cited

U.S. PATENT DOCUMENTS

| | | | | |
|---|---|---|---|---|
| 5,619,709 A * | 4/1997 | Caid et al. | ................... | 715/209 |
| 5,794,178 A * | 8/1998 | Caid et al. | ...................... | 704/9 |
| 5,839,106 A * | 11/1998 | Bellegarda | ................... | 704/257 |
| 6,374,217 B1 * | 4/2002 | Bellegarda | ................... | 704/240 |
| 6,687,696 B2 * | 2/2004 | Hofmann et al. | ................ | 707/6 |
| 6,728,695 B1 * | 4/2004 | Pathria et al. | ................... | 707/2 |
| 6,954,750 B2 * | 10/2005 | Bradford | ......................... | 707/6 |
| 7,031,970 B2 * | 4/2006 | Blitzer | ........................ | 707/100 |
| 7,117,437 B2 * | 10/2006 | Chen et al. | ................... | 715/254 |
| 7,328,216 B2 * | 2/2008 | Hofmann et al. | ............ | 707/100 |
| 7,376,893 B2 * | 5/2008 | Chen et al. | ................... | 715/254 |
| 7,451,395 B2 * | 11/2008 | Brants et al. | ................ | 715/254 |
| 7,529,765 B2 * | 5/2009 | Brants et al. | ................ | 707/102 |
| 2006/0242140 A1 * | 10/2006 | Wnek | ............................. | 707/5 |
| 2006/0242190 A1 * | 10/2006 | Wnek | .......................... | 707/102 |
| 2007/0067281 A1 * | 3/2007 | Matveeva et al. | .............. | 707/5 |

OTHER PUBLICATIONS

Lin et al., Scalable Collaborative Filtering Using Cluster-based Smoothing, Proceedings of the 28th annual Internation ACM SIGIR conference on Research and development in information retrieval, 2005, pp. 114-121.*

(Continued)

*Primary Examiner*—David R Hudspeth
*Assistant Examiner*—Lamont M Spooner
(74) *Attorney, Agent, or Firm*—Lee & Hayes, PLLC

(57) ABSTRACT

A scalable two-pass scalable probabilistic latent semantic analysis (PLSA) methodology is disclosed that may perform more efficiently, and in some cases more accurately, than traditional PLSA, especially where large and/or sparse data sets are provided for analysis. The improved methodology can greatly reduce the storage and/or computational costs of training a PLSA model. In the first pass of the two-pass methodology, objects are clustered into groups, and PLSA is performed on the groups instead of the original individual objects. In the second pass, the conditional probability of a latent class, given an object, is obtained. This may be done by extending the training results of the first pass. During the second pass, the most likely latent classes for each object are identified.

10 Claims, 6 Drawing Sheets

OTHER PUBLICATIONS

Landauer et al., An Introduction to Latent Semantic Analysis, 1998, Discourse Processes, 25 pp. 259-284.*

Brants et al., Topic-Based Segmentation with Probabilistic Latent Semantic Analysis, 2002, ACM, pp. 211-218.*

Sun et al, Supervised Latent Semantic Indexing for Document Categorization, IEEE (ICDM '04), 2004, pp. 535-538.*

Xu et al., Using probabilistic latent semantic analysis for Web page grouping, IEEE, 2005, pp. 29-36.*

Hofmann, Thomas, "Latent Semantic Models for Collaborative Filtering," ACM Transactions on Information Systems, vol. 22, No. 1, Jan. 2004, pp. 89-115.

Hofmann, Thomas, "Probabilistic Latent Semantic Analysis," Uncertainity in Artificial Intelligence, UAI '99, Stockholm, first date of publication unknown, 8 pages.

* cited by examiner

SCALABLE PROBABILISTIC LATENT SEMANTIC ANALYSIS

BACKGROUND

A methodology for discovering the relationships among different types of object has been proposed, known as Probabilistic Latent Semantic Analysis (PLSA). PLSA is a flexible latent class statistical mixture model that is useful in various types of applications, such as information retrieval, web mining, collaborative filtering, and co-citation analysis.

The PLSA model is typically trained using conventional expectation-maximization algorithms. However, both the storage and computational costs of such training becomes expensive as the training data set becomes large. The training time and storage space requirements are each proportional to the training data set size and the number of latent classes. Accordingly, this makes PLSA unsuitable for use with large amounts of training data.

For instance, web mining and personalized web searches typically involve an environment having an exceedingly large training data set. Where there are, for example, one hundred million collected records and ten thousand latent classes (which is not unusual in this context), the computation cost for each iteration of an expectation-maximization algorithm can be as high as 10e12. Indeed, when the number of users in such an environment is one million (a small number of users in the context of the Internet), the storage requirements for storing the PLSA model parameters will be 10e10, which is simply not practical, especially since the parameters would typically need to be stored in main memory to be useful. It can be seen, therefore, how the standard PLSA training algorithm does not work well for larger data sets.

SUMMARY

Thus, a way to improve the scalability of the PLSA model is disclosed herein. In particular, a scalable two-pass methodology is disclosed that more efficiently performs PLSA, especially large data sets. The improved methodology can greatly reduce the storage and/or computational costs of training a PLSA model.

In the first pass of the two-pass methodology, objects are clustered into groups, and PLSA is performed on the groups instead of the original individual objects. In the second pass, the conditional probability of a latent class, given an object, is obtained. This may be done by extending the training results of the first pass. During the second pass, the most likely latent classes for each object are identified. This may reduce the number of relationships between objects and latent classes that need to be tracked, and may further substantially reduce both the time and storage costs of the second pass of PLSA training.

The illustrative methodologies discussed herein may be partially or fully automated and may be implemented in whole or in part by a computing system such as a personal computer or a larger server computer executing computer-readable instructions stored on a computer-readable medium such as, but not limited to, one or more hard disk drives, memories, and/or optical or magnetic disks.

These and other aspects of the disclosure will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Illustrative Computing Environment

Figure 1:
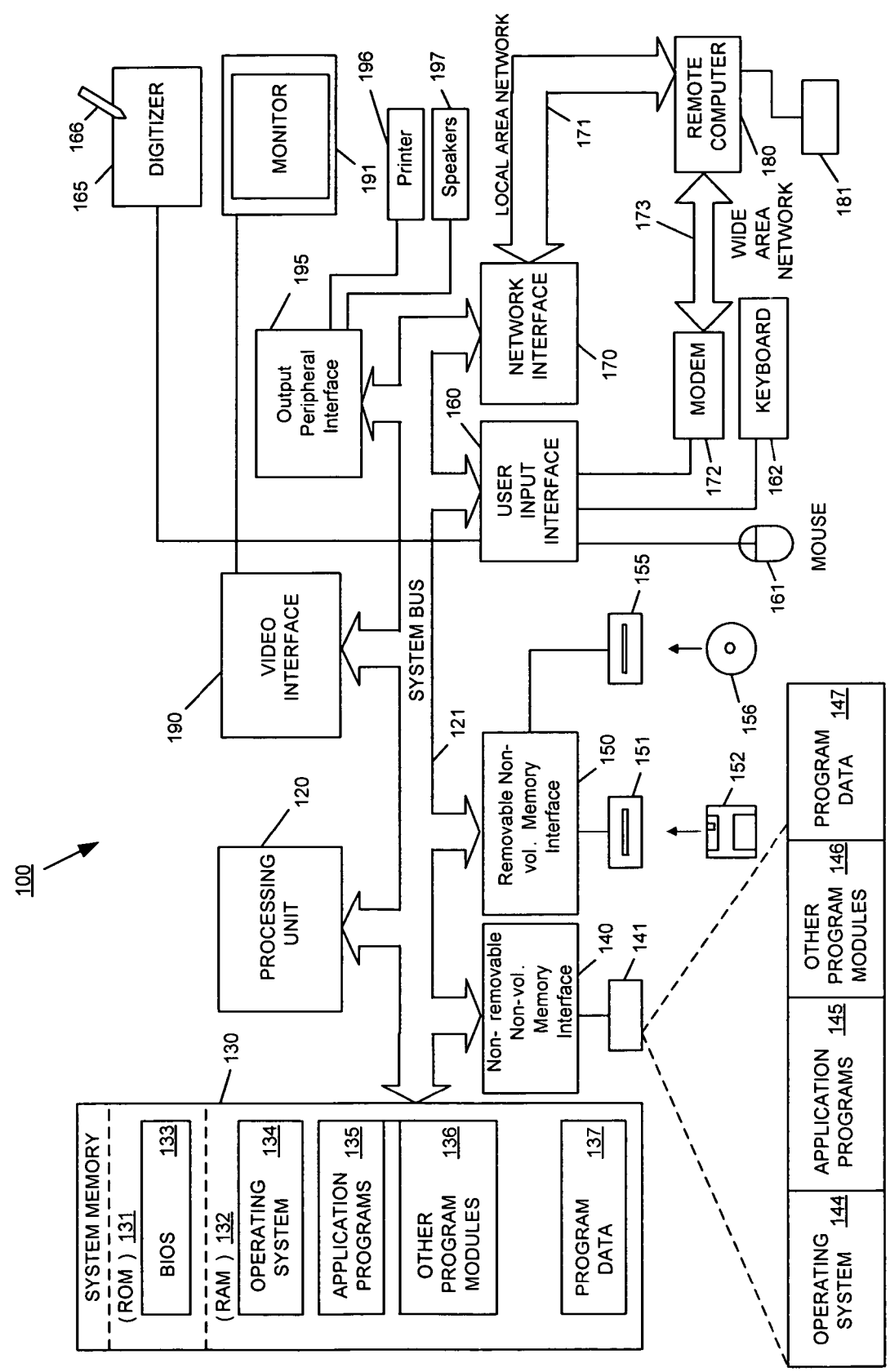
FIG. 1 is a functional block diagram of an illustrative computing environment that may be used to implement some or all of the various features discussed herein.

FIG. 1 illustrates an example of a suitable computing system environment 100 in which aspects as described herein may be implemented. Computing system environment 100 is only one example of a suitable computing environment and is not intended to suggest any limitation as to the scope of use or functionality of various aspects as described herein. Neither should computing system environment 100 be interpreted as having any dependency or requirement relating to any one or combination of components illustrated in illustrative computing system environment 100.

One or more other general purpose or special purpose computing system environments or configurations may be used. Examples of well known computing systems, environments, and/or configurations that may be suitable include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the disclosure herein may be described in the general context of computer-executable instructions, such as program modules, stored on one or more computer-readable media and executable by a computer. Generally, program modules include routines, programs, objects, components, data structures, etc. that perform particular tasks or implement particular abstract data types. Embodiments discussed herein may also be operational with distributed computing environments where tasks are performed by remote processing devices that are linked through a communications network. In a distributed computing environment, program modules may be located in both local and remote computer-readable media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer-readable media and communication media. Computer-readable media are tangible media, and may include volatile, nonvolatile, removable, and non-removable media implemented in any method or technology for storage of information such as computer-readable instructions, data structures, program modules or other data. For example, computer-readable media includes random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-readable media, are both intended to be included within the scope of the term "computer-readable medium" as described and claimed herein.

System memory 130 includes computer-readable storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

The PLSA Aspect Model

A general framework of unsupervised learning from dyadic (i.e., two-dimensional) data is known in traditional PLSA. For instance, in the text-based information retrieval environment, assume that a set of documents D and a set of words W exist, wherein the number of occurrences of a word $w \in W$ in a document $d \in D$ is denoted as n(d,w). The PLSA aspect model is built on the assumption that D and W are conditionally independent given latent classes Z, which represent a random data generation model as follow:

1. Randomly choose a latent class $z \in Z$ according to P(z);
2. Randomly generate a document $d \in D$ with probability P(d|z); and
3. Randomly generate a word $w \in W$ with probability P(w|z).

Figure 2:
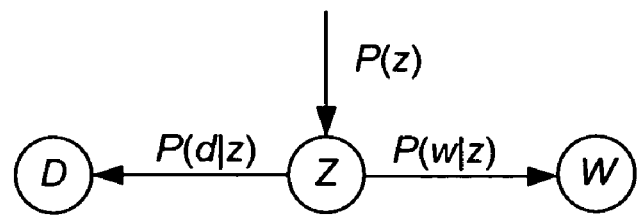
FIG. 2 is an illustrative graphical representation of a PLSA aspect model, viewed as a Bayesian network.

FIG. 2 shows an illustrative graphical representation of the above PLSA aspect model, viewed as a Bayesian network. Model parameters of this PLSA aspect model are P(z), P(w|z), and P(d|z). The joint probability mass function may therefore be calculated as follows:

$$P(d, w) = \sum_{z \in Z} P(z)P(w|z)P(d|z). \quad \text{(Equation 1)}$$

Expectation-Maximization Algorithm

The expectation-maximization algorithm may be adapted to estimate the parameters of the PLSA aspect model from co-occurrences of W and D. A goal of training the PLSA aspect model is to maximize log-likelihood of the training data, such that:

$$L = \sum_{(d,w)} n(d, w) \log P(d, w). \quad \text{(Equation 2)}$$

In the expectation-maximization algorithm, the estimate of the posterior probability of latent class z given d and w is:

$$P(z|d, w) = \frac{P(z)P(w|z)P(d|z)}{\sum_{z'} P(z')P(w|z')P(d|z')}. \quad \text{(Equation 3)}$$

Also, the model parameters are re-estimated by maximizing the training data log-likelihood as follows:

$$P(d|z) = \frac{\sum_w n(d, w)P(z|d, w)}{\sum_{d',w} n(d', w)P(z|d', w)}, \quad \text{(Equation 4a-4c)}$$

$$P(w|z) = \frac{\sum_d n(d, w)P(z|d, w)}{\sum_{d',w} n(d, w')P(z|d, w')},$$

$$P(z) = \frac{\sum_{d,w} n(d, w)P(z|d, w)}{\sum_{d,w,z'} n(d, w)P(z'|d, w)}$$

Complexity Analysis of Training of the PLSA Aspect Model

Let S denote all co-occurrences in the training data, such that:

$$S = \{(d, w) | n(d, w) > 0, d \in D, w \in W\}. \quad \text{(Equation 5)}$$

In the expectation step of the expectation-maximization algorithm, each pair of latent classes and observed co-occurrences uses a fixed number of arithmetic computations to estimate P(z|d,w). These fixed number of computations result in a computational cost of O(|Z||S|). In the maximization step, each conditional probability over objects and latent classes also uses a fixed number of computations, thus resulting in a computational cost of P(|Z||W|+|Z||D|). Thus, it can be seen that the time complexity of each expectation-maximization iteration is:

$$O(|Z|(|S|+|D|+|W|)). \quad \text{(Equation 6)}$$

Without loss of generality, this means that $|D| \leq |S|$ and $|W| \leq |S|$, such that the complexity may be written as:

$$O(|S||Z|). \quad \text{(Equation 7)}$$

For each expectation-maximization iteration, the conditional probabilities P(d|z) and P(w|z) may be stored, thereby resulting in the space complexity of O(|D||Z|+|W||Z|). In addition, the co-occurrences may be stored, thereby resulting in the space complexity of O(|S|). Thus, the total space complexity would be:

$$O(|D||Z|+|W||Z|+|S|). \quad \text{(Equation 8)}$$

As previously mentioned, the training data set may be large, such as on the order of millions of words and/or documents, or more. Thus, as also previously mentioned, traditional PLSA is infeasible due to the large time and storage costs involved.

Scalable PLSA

From observation of the exponential decay law of conditional probability distributions, the present inventors have found that a two-pass algorithm for training a PLSA model may significantly reduce the time and storage costs needed in comparison with standard models. In particular, the present inventors have observed that the conditional probability P(d|z) approximately obeys the exponential decay law, as follows. Let $z_d^{(k)}$ denote the $k_{th}$ most possible latent class for a specified document $d \in D$, such that:

$$P(z_d^{(k)}|d) = A(d)e^{-\lambda(d)k}, \quad \text{(Equation 9)}$$

wherein $\lambda(d) > 0$ and $A(d) = e^{\lambda(d)}P(z_d^{(1)}|d)$. Both the conditional probabilities $P(z_w^{(k)}|w)$ and $P(z_{d,w}^{(k)}|d,w)$ similarly obey the exponential decay law.

In the PLSA aspect model, for $\lambda = \lambda(d)$ and $A = A(d)$ when d is fixed, $$P(w|d) = \sum_{1\le k\le |Z|} P(w|z_d^{(k)})P(z_d^{(k)}|d) \quad \text{(Equation 10a)}$$

$$= \sum_{1\le k\le |Z|} P(w|z_d^{(k)})e^{-\lambda k} \quad \text{(Equation 10b)}$$

$$\approx \sum_{1\le k\le \beta|Z|} P(w|z_d^{(k)})e^{-\lambda k} \quad \text{(Equation 10c)}$$

$$\approx \sum_{1\le k\le \beta|Z|} P(w|z_d^{(k)})P(z_d^{(k)}|d). \quad \text{(Equation 10d)}$$

Equation 10c approximates Equation 10b by eliminating the negligible terms in the summation where $k>\beta|Z|$. The parameter $\beta$, where $0<\beta<1$, is used to determine the proportion of terms, which remain in the final approximation of $P(w|d)$, as shown in Equation 10d. Thus, the conditional probability may be estimated from a relatively small portion of the latent classes, such that computations may be eliminated for the remaining latent classes, thereby substantially decreasing training time. And yet, despite this computational simplification, the effectiveness will likely not significantly differ from traditional PLSA.

Figure 3:
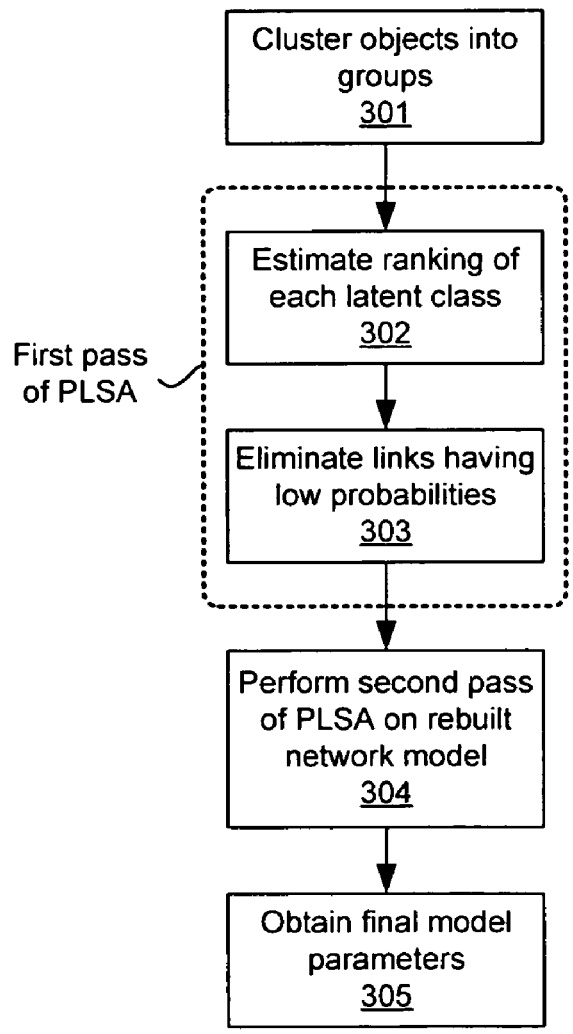
FIG. 3 is an illustrative flowchart showing steps that may be performed in implementing SPLSA.

To implement this new version of PLSA, which is referred to herein as scalable PLSA, or SPLSA, involves two passes of PLSA. Referring to FIG. 3, the following steps may be performed to implement SPLSA. In step 301, objects are clustered into a plurality of groups. To do this for each object, the probability that the object belongs to a specified group is computed. Next, in steps 302 and 303, a first pass of PLSA is performed to estimate the rankings of each latent class given an object, and links between latent classes and objects having low probabilities are eliminated by taking advantage of the exponential decay law. The threshold for determining what is a low probability may be a pre-determined and adjustable parameter. Next, in step 304, a second pass of PLSA is performed on the rebuilt network model, and in step 305 the final model parameters are obtained.

Clustering Stage

Figure 4:
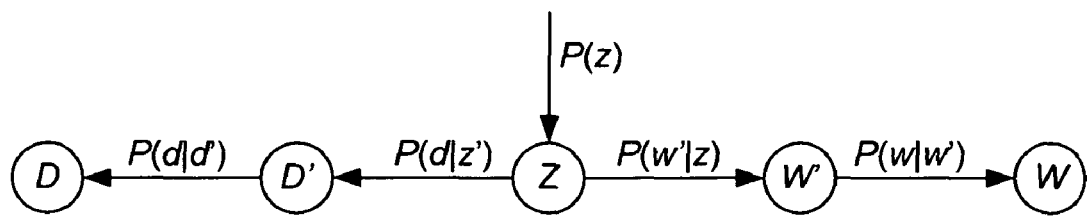
FIG. 4 is an illustrative first pass PLSA model, viewed as a Bayesian network.

FIG. 4 shows an illustrative first pass PLSA model as a Bayesian network. Any clustering method may be used to implement clustering step 301. For example, k-means may be used in step 301 to cluster documents and words in the PLSA aspect model. Assume that documents D and words W are separately clustered into groups D' and W', respectively. Let functions f: D→D' and g: W→W' denote the clustering mappings, where d∈D belongs to group f(d)∈D' and w∈W belongs to group g(w)∈W', where D' and W' are the set of groups. P(d|d') and P(w|w') are used to denote the probabilities that d belongs to d' and that w belongs w', respectively. P(d|d') may be obtained, for example, by computing the similarity between d and the centroid of d'.

First Pass

After clustering the objects in step 301, PLSA may be performed, in steps 302 and 303, on D', W', and Z with the training data S'={(d',w')|n(d',w')>0, d∈D, w∈W}, where:

$$P(d|z) = \sum_{\substack{(d,w) \\ f(d)=d' \\ g(w)=w'}} n(d,w) \quad \text{(Equation 11)}$$

The parameters $P(z)$, $P(d'|z)$, and $P(w'|z)$ may then be obtained. To extend these results to estimate the rankings of latent classes for the objective PLSA model on D, W, and Z, then $P(z)$ may remain unchanged, whereas $P(d|z)$ and $P(w|z)$ may be calculated as follows:

$$P(d|z) = \sum_{d'\in D'} P(d|d')P(d'|z) \quad \text{(Equation 12a)}$$

$$P(w|z) = \sum_{w'\in W'} P(w|w')P(w'|z) \quad \text{(Equation 12b)}$$

Thus, the ranking of a latent class z may now be estimated given a document d (or other object) according to the following equation:

$$P(z|d)=P(d)^{-1}P(d|z)P(z)\propto P(d|z)P(z) \quad \text{(Equation 13)}$$

Second Pass

Figure 5:
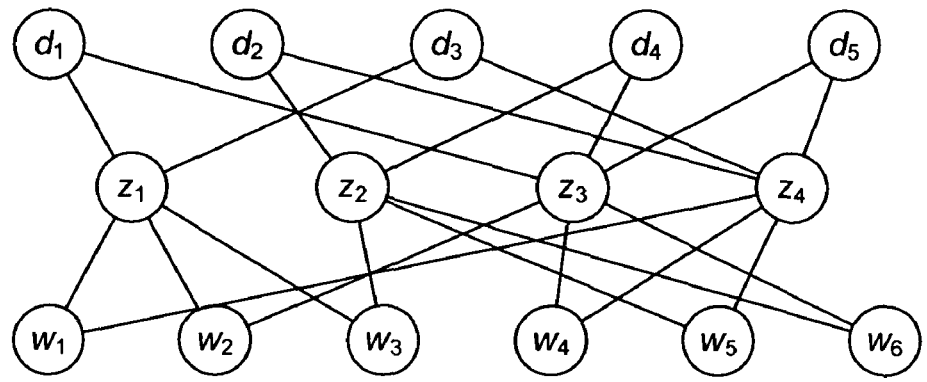
FIG. 5 is an illustrative Bayesian network showing an effect of eliminating low-probability links between latent classes and objects.

After the first PLSA pass, conditional probabilities of latent classes are estimated and ranked for each object, and some links in D×Z and W×Z are eliminated. FIG. 5 shows an illustrative effect of eliminating low-probability links between latent classes and objects. The eliminated links are no longer taken into account, thereby reducing the number of computations required for each iteration of the expectation-maximization algorithm.

The remaining latent classes for a given d∈D and w∈W are denoted as $Z_d$ and $Z_w$, respectively. In addition, the document set and word set of a given z∈Z is denoted as Dz and Wz. Since some $P(d|z)$ and $P(w|z)$ are eliminated, the related $P(z|d,w)$ are also eliminated. Let $Z_{d,w}=Z_d\cup Z_w$. The joint probability mass function can be reformulated as:

$$P(d,w)=\sum_{z\in Z_{d,w}} P(z)P(d|z)P(w|z) \quad \text{(Equation 14)}$$

Using these notations, each expectation-maximization iteration may be modified to perform a second pass of PLSA, as follows:

Expectation Step:

$$P(z|d,w)\propto P(z)P(w|z)P(d|z), \text{ for } z\in Z_{d,w}. \quad \text{(Equation 15a)}$$

Maximization Step:

$$P(d|z) \propto \sum_{w|z\in Z_{d,w}} n(d,w)P(z|d,w), \text{ for } d\in D_z. \quad \text{(Equation 15b)}$$

$$P(w|z) \propto \sum_{d|z\in Z_{d,w}} n(d,w)P(z|d,w), \text{ for } w\in W_z. \quad \text{(Equation 15c)}$$

$$P(z) \propto \sum_{(d,w)|z\in Z_{d,w}} n(d,w)P(z|d,w), \text{ for } z\in Z. \quad \text{(Equation 15d)}$$

From the second pass, the parameters $P(d|z)$, $P(w|z)$, and $P(z)$ may be obtained.

Complexity Analysis

The cost of SPLSA is divided into four parts: the cost of clustering, the cost of the first pass of PLSA, the cost of rebuilding the model, and the cost of the second pass of PLSA. Because scalable algorithms are available for clustering objects, an analysis of the cost of clustering need not be discussed in detail other than in passing.

However, the time and space complexities of the first pass of PLSA may be parameterized by $|Z|$, $|D'|$, and $|W'|$, in accordance with the previously-discussed analysis, as follows:

Time: $O(|Z|(|S'|+|D'|+|W'|))$ (Equation 16a)

Space: $O(|D'||Z|+|W'||Z|+|S'|)$ (Equation 16b)

Since |D'| and |W'| may be expected to be small, the cost is negligible in comparison with standard PLSA.

When ranking latent classes of objects, computing Equations 12a and 12b may be relatively time-consuming. To reduce this computation, a very small but principal portion of clusters (e.g., three to five clusters) in D' or W' may be selected to perform the summations in Equations 12a and 12b for each object. This is sufficient to roughly determine the rankings of latent classes. Thus, the complexity of ranking would then be $O(|D|||Z|+|W|||Z|)$.

As to the second pass of PLSA, only $Z_d$ links remain between each object and latent class. Thus, the complexity of each expectation-maximization iteration is reduced to:

Time: $O(\beta|Z|(|D|+|W|+|S|))$, where $\beta = \frac{Z_d}{Z}$ (Equation 17a)

Space: $O(\beta|Z||D|+\beta|Z||W|+|S|)$, where $\beta = \frac{Z_d}{Z}$ (Equation 17b)

Compared with the original complexity as shown in Equations 6 and 8, SPLSA may reduce both time and space complexity by a factor of $\beta$. As the most critical factor stated in Equation 7, SPLSA may run $1/\beta$ times faster to train a PLSA model. Moreover, the number of expectation-maximization iterations need not be as high as in standard methods. Therefore, the computation and time costs may be even further reduced.

An Example

Standard PLSA and the new SPLSA technique will now be compared through an example correlating to actual experiments performed by the inventors. From the example, it will be seen that SPLSA has the potential to be substantially faster and less costly than standard PLSA, without much of a sacrifice in effectiveness.

Figure 6:
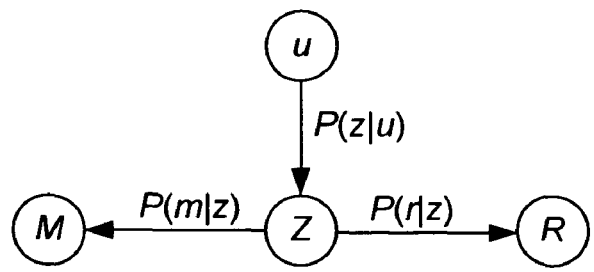
FIG. 6 is an illustrative simple collaborative filtering model, viewed as a Bayesian network.

In the example, collaborative filtering is performed on a particular set of data, which will be referred to herein as the movie data. A workstation with a 3.0 GHz processor and 1 GB of memory is used to perform training and testing phases. The movie data contains 1,623 items (in this case, movies) and 61,265 user profiles with a total of over 2.1 million movie ratings. The rating scale for each movie is in the range of 0 to 5, with only discrete rating values being valid. A simple collaborative filtering model is used as shown in FIG. 6. The notations U, M, and R in FIG. 6 denote, respectively, the set of users, the set of movies, and the set of ratings. This model is a simple extended version of the aspect model.

In the training phase, the parameters P(z), P(u|z), P(m|z), and P(r|z) are estimated. In the testing phase, when providing rankings for several movies by a new user, one expectation-maximization iteration is performed to estimate P(u|z) and to predict rankings of other movies. This example will illustrative the performance of SPLSA at various data set scales. This example will also illustrate how much benefit may be expected from SPLSA, as well as what performance may be expected from SPLSA when the data is sparse.

The effectiveness of collaborative filtering in this example is measured by the mean absolute error (MAE). Let $\hat{X}$ be the set of testing users, and for $\hat{x} \in \hat{X}$, let $Y_x$ be the set of pages to be rated. If the predicted rating for a movie $y \in Y_x$ is $\hat{v}(\hat{x},y)$, then the MAE is calculated as follows:

$$\sum_{\hat{x} \in \hat{X}} \frac{1}{|Y_{\hat{x}}|} \sum_{y \in Y_{\hat{x}}} |v(\hat{x},y) - \hat{v}(\hat{x},y)|.$$ (Equation 18)

In a first group of experiments, PLSA and SPLSA are both performed on different data set scales. The data sets are randomly sampled from the movie data, and the training data is scaled from 500 users to 20,000 users. The scale of test data is set to 200 users for small data and 1000 users for large data. When training using standard PLSA, 15 expectation-maximization iterations are performed. When training using SPLSA, movies are clustered into 50 groups and users are clustered into 0.031|U| groups before the first pass. The feature space M×R is defined when clustering users, and the feature space U×R is defined when clustering movies. Then, 30 expectation-maximization iterations are performed in the first pass. This results in a new network in which each user and each movie is connected to only 50 latent classes. Then, 15 expectation-maximization iterations are performed in the second pass. The number of latent classes is fixed to 300 in all experiments.

Figure 7:
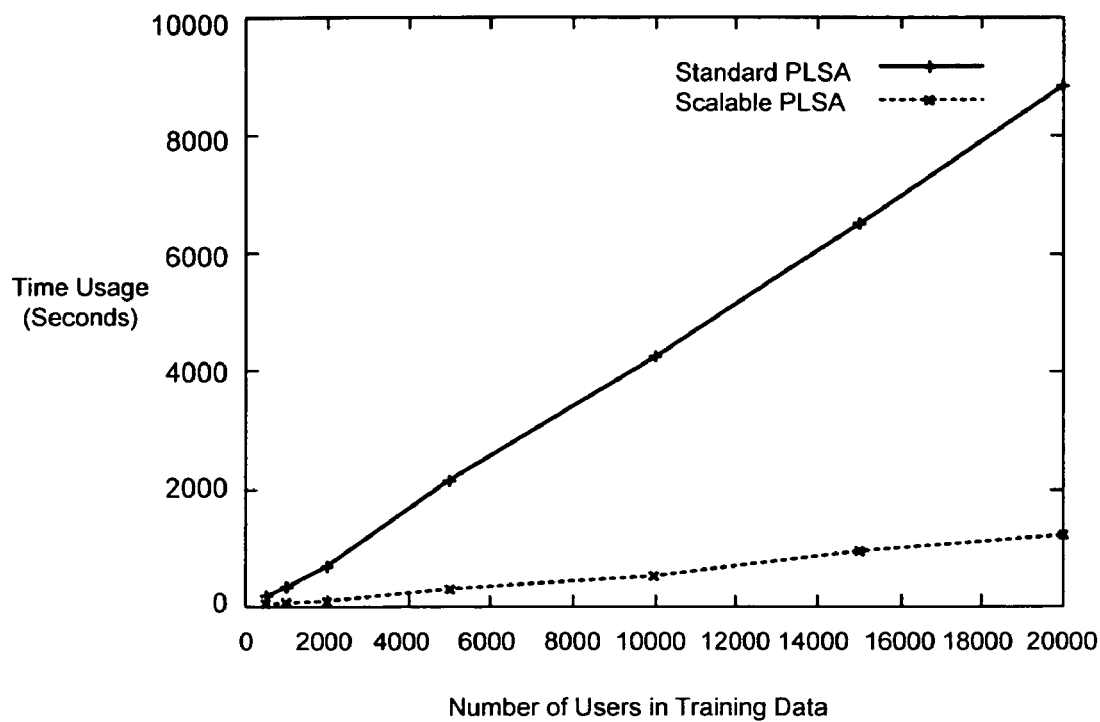
FIGS. 7 and 8 are graphs showing illustrative performance on various scales of data for a first group of experiments comparing PLSA and SPLSA.
Figure 8:
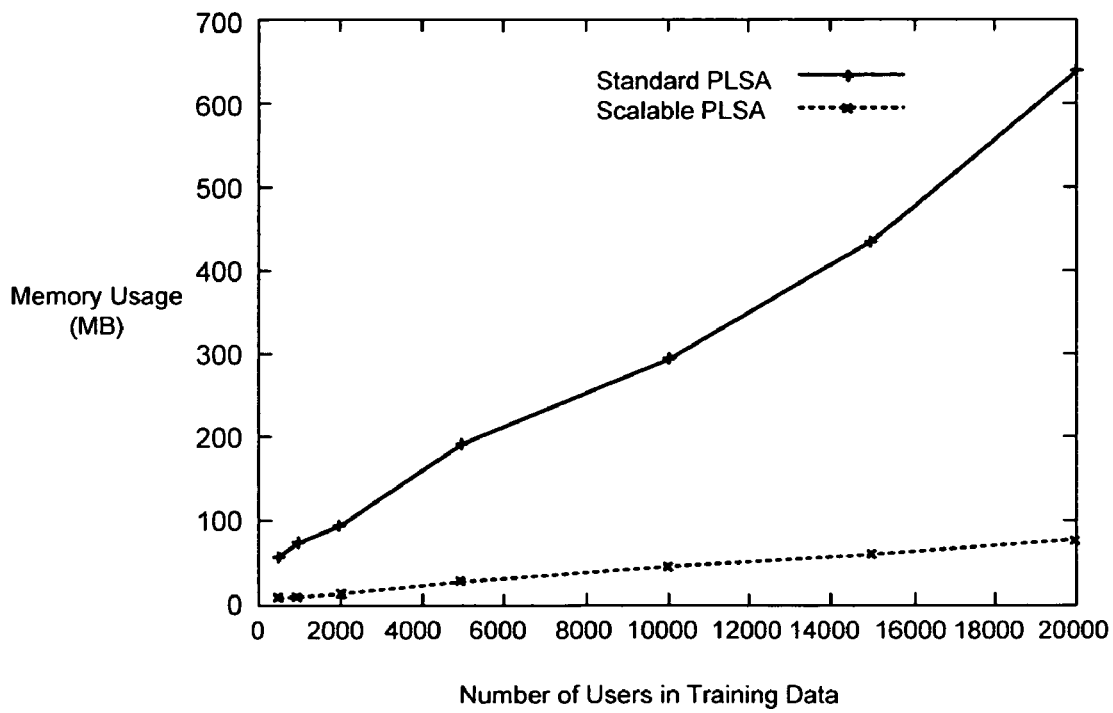

Table 1 below and FIGS. 7 and 8 show the performance on various scales of data for the first group of experiments. From these results, it can be concluded that SPLSA provides a significant improvement in this case as to both the time cost and space as compared with standard PLSA. At the same time, the MAE is nearly identical for SPLSA as compared with standard PLSA.

TABLE 1

MAE of PLSA and SPLSA

| Data Set | | MAE of PLSA | | | MAE of SPLSA | | |
|---|---|---|---|---|---|---|---|
| Training | Testing | Given 5 | Given 10 | Given 20 | Given 5 | Given 10 | Given 20 |
| 500 | 200 | 1.05 | 1.03 | 1.01 | 1.02 | 1.00 | 0.99 |
| 1,000 | 200 | 1.08 | 1.05 | 0.99 | 1.09 | 1.07 | 0.98 |
| 2,000 | 200 | 1.07 | 1.04 | 1.04 | 1.06 | 1.03 | 1.02 |
| 5,000 | 1000 | 1.07 | 1.02 | 0.99 | 1.07 | 1.03 | 1.01 |
| 10,000 | 1,000 | 1.09 | 1.04 | 1.01 | 1.09 | 1.03 | 1.02 |
| 15,000 | 1,000 | 1.06 | 1.00 | 0.99 | 1.06 | 1.01 | 1.01 |
| 20,000 | 1,000 | 1.08 | 1.01 | 0.97 | 1.05 | 1.02 | 1.00 |

Figure 9:
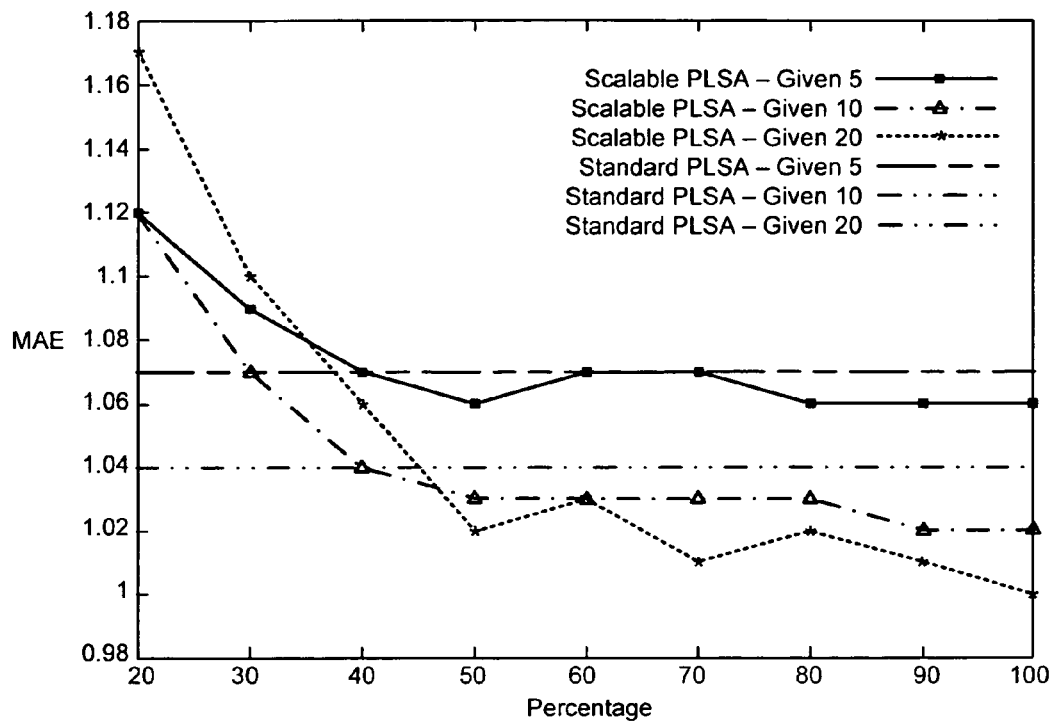
FIGS. 9 and 10 are graphs showing illustrative mean absolute errors for various experimental results involving both PLSA and SPLSA.

A second group of experiments tests how much improvement is achieved using SPLSA. In this second group, $|Z_d|$ is set from 100 to 20 and the remaining parameters remain unchanged from the first group of experiments. The effectiveness of SPLSA is then observed for a data set of training data with 2,000 users and test data with 200 users. The results are shown in FIG. 9, which shows that the MAE of SPLSA suddenly increases as $|Z_d|$ decreases from 50 to 30. This means that it may be undesirable to eliminate too many links from the original network in step 303.

A third group of experiments are used to compare PLSA with SPLSA under the condition that the data is relatively sparse. For each user in the training data, some of the ranking records are randomly eliminated to create sparse training data. The effectiveness of both PLSA and SPLSA under these circumstances are then tested.

Figure 10:
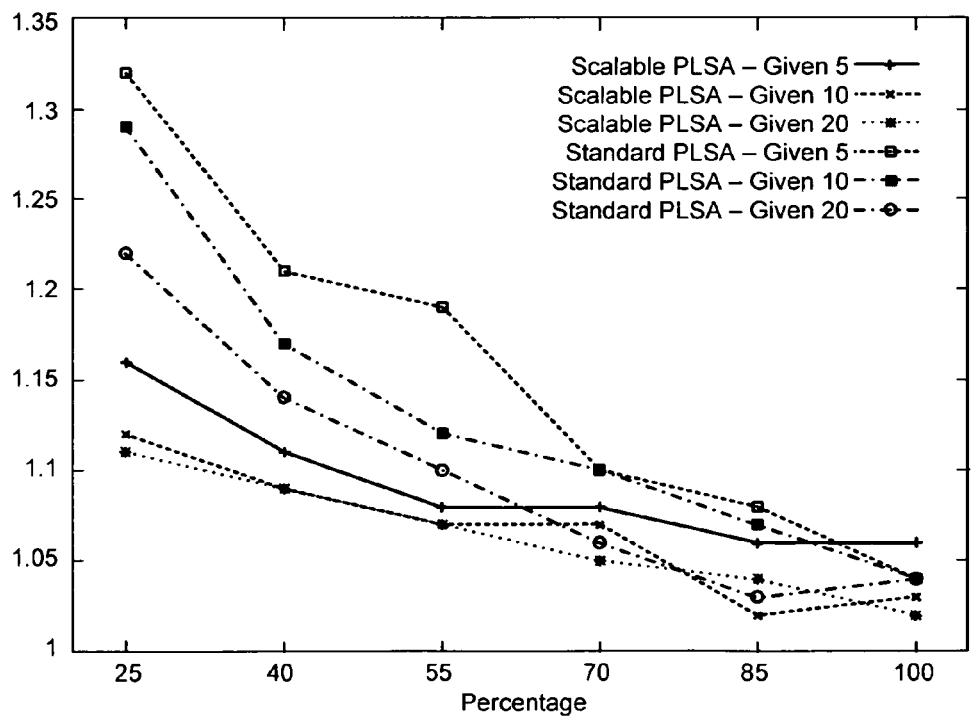

FIG. 10 shows the MAE results for both PLSA and SPLSA in this third group of experiments. Here various sparseness is induced by providing, respectively, 25%, 40%, 55%, 70%, 85%, and 100% of the original data records. It can be seen that as the data becomes more sparse, the MAE of standard PLSA drops more quickly than the MAE of SPLSA. This phenomenon may be explained due to the indirect data smoothing performed on sparse data sets in SPLSA but not in PLSA. Thus, for sparse data sets, SPLSA actually performs better than PLSA.

Figure 11:
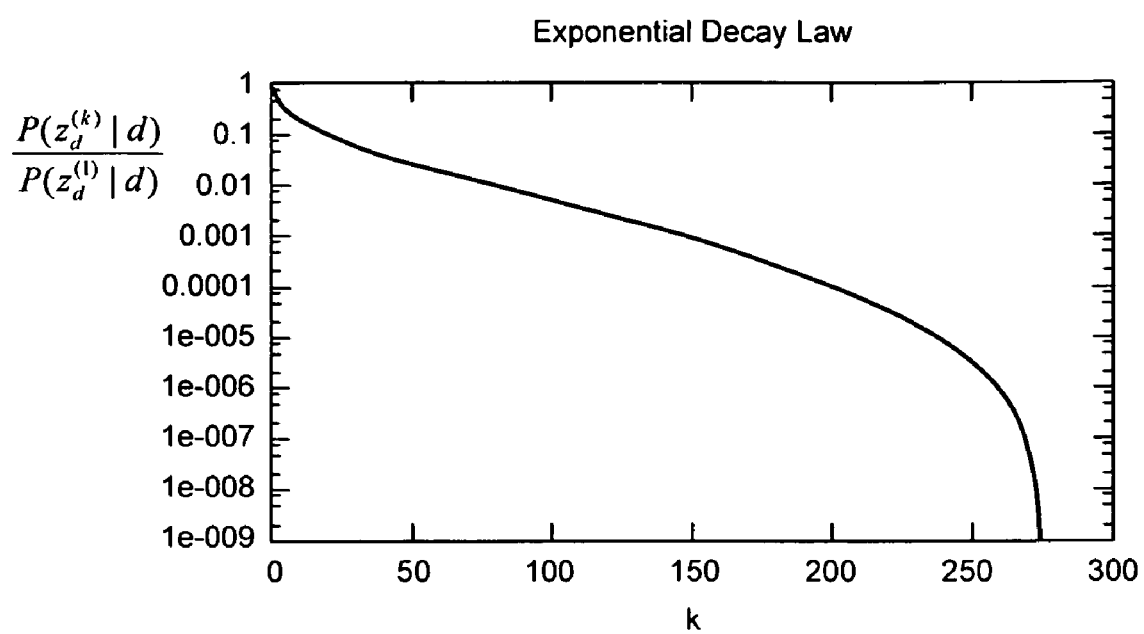
FIG. 11 is a graph showing the exponential decay law of $P(z_u^{(k)}|u)$.

In a fourth group of experiments, the exponential decay law is verified. FIG. 11 shows the exponential decay law of $P(z_u^{(k)}|u)$. The Y axis (set forth in a logarithmic scale) denotes the ratio of average conditional probabilities of latent classes with rank k and those classes with rank 1. The X axis denotes the rank of the latent classes. It can be seen that the conditional probability closely follows the exponential decay law, with a bias seen in the approximately last 50 ranked classes.

Computerized Implementation

The SPLSA methodology may be partially or fully automated and/or implemented by a computer executing software. The software may be embodied as computer-executable instructions stored on a computer-readable medium such as, but not limited to, a hard disk drive, an optical disk such as a CD-ROM disk, a magnetic removable disk, a tape cassette, a memory, and/or any of these in any combination or quantity. The computer-readable medium need not be contained on any single type of storage, but may be contained on a combination of them. For instance, a computer-readable medium may include a plurality of CD-ROM disks and/or a plurality of memory chips.

Any or all of the steps of FIG. 3 may be embodied as computer-executable instructions stored on a computer-readable medium. The computer-executable instructions may, when executed by a computer such as computer 100, cause any or all of the steps of FIG. 3 and the equations and calculations discussed herein to be implemented, as desired. In addition, any and all data needed to perform the steps of FIG. 3 and other calculations may be provided as data stored on a computer-readable medium and readable by the computer. Data may be read by computer 100 such through any of its computer-readable medium interfaces, such as interfaces 140 and/or 150, and/or a user input interface such as keyboard 162 and/or digitizer 165. Results of calculations and determinations may be output to the user such as through monitor 191, and/or stored as data on a computer-readable medium such as through interfaces 140 and/or 150.

CONCLUSION

It has thus been shown how a new SPLSA approach may perform more efficiently, and in some cases even more accurately, than traditional PLSA in a number of situations including large data sets and sparse data sets.

What is claimed is:

1. A computer-readable medium storing computer-executable instructions for performing operations comprising:
   clustering a set of data objects into a plurality of groups;
   performing a first pass of performing probabilistic latent semantic analysis on the groups;
   identifying a plurality of latent classes of the set of data objects;
   calculating a first conditional probability of a data object of the set of data objects given a latent class of the plurality of latent classes;
   estimating a ranking of each latent class;
   eliminating low probability links between the set of data objects and the latent classes based on the rankings, the low probability links being determined based on a predetermined probability threshold;
   determining remaining links between the set of data objects and the latent classes;
   performing a second pass of probabilistic latent semantic analysis on a result of the first pass based on the remaining links between the set of data objects and the latent classes; and
   calculating a second conditional probability of a data object of the set of data objects given the remaining links between the set of data objects and the latent classes.

2. The computer-readable medium of claim 1, wherein the set of data objects is a set of words in a plurality of documents.

3. The computer-readable medium of claim 2, wherein the clustering includes clustering the set of words into a plurality of groups of words and clustering the set of documents into a plurality of groups of documents.

4. The computer-readable medium of claim 1, further comprising determining probabilistic latent semantic analysis model parameters from results of the second pass.

5. The computer-readable medium of claim 1, wherein the estimating includes determining, for each of the latent classes, the ranking of that latent class given a respective one of the objects, according to the following calculation:

$$P(z|d)=P(d)^{-1}P(d|z)P(z) \propto P(d|z)P(z),$$

wherein z is the latent class and d is the respective given object.

6. A method of performing two-pass probabilistic latent semantic analysis, the method comprising:
   receiving a set of data objects at an input of a computing device;
   clustering the set of data objects into a plurality of groups;
   performing a first pass of performing probabilistic latent semantic analysis on the groups;
   estimating a ranking of each latent class;
   eliminating low probability links between the set of data objects and the latent classes based on the rankings, the low probability links being determined based on a predetermined probability threshold;
   determining remaining links between the set of data objects and the latent classes; and
   performing a second pass of probabilistic latent semantic analysis, using a processor of the computing device, on a result of the first pass based on the remaining links between the set of data objects and the latent classes.

7. The method of claim 6, wherein the set of data objects is a set of words in a plurality of documents.

8. The method of claim 7, wherein the clustering includes clustering the set of words into a plurality of groups of words and clustering the set of documents into a plurality of groups of documents.

9. The method of claim 6, further including determining probabilistic latent semantic analysis model parameters from results of the second pass.

10. The method of claim 6, wherein the estimating the ranking includes determining, for each of the latent classes, the ranking of that latent class given a respective one of the objects, according to the following calculation:

$$P(z|d)=P(d)^{-1}P(d|z)P(z) \propto P(d|z)P(z),$$

wherein z is the latent class and d is the respective given object.

* * * * *